US012348170B2

(12) United States Patent
Liu et al.

(10) Patent No.: US 12,348,170 B2
(45) Date of Patent: Jul. 1, 2025

(54) ELECTROMAGNETIC INTERFERENCE (EMI) MITIGATION IN PULSE WIDTH MODULATION (PWM) INVERTERS USING LEARNING-BASED FREQUENCY MODULATED CARRIERS

(71) Applicants: Mitsubishi Electric Research Laboratories, Inc., Cambridge, MA (US); Mitsubishi Electric Corporation, Tokyo (JP)

(72) Inventors: Dehong Liu, Lexington, MA (US); Retsu Sugawara, Tokyo (JP); Philip Orlik, Cambridge, MA (US)

(73) Assignees: Mitsubishi Electric Research Laboratories, Inc.; Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 18/238,061

(22) Filed: Aug. 25, 2023

(65) Prior Publication Data

US 2025/0038695 A1 Jan. 30, 2025

Related U.S. Application Data

(60) Provisional application No. 63/528,691, filed on Jul. 25, 2023.

(51) Int. Cl.
*H02P 29/50* (2016.01)
*H02M 1/44* (2007.01)
(Continued)

(52) U.S. Cl.
CPC .............. *H02P 29/50* (2016.02); *H02M 1/44* (2013.01); *H02M 7/5395* (2013.01); *H02P 27/08* (2013.01)

(58) Field of Classification Search
CPC ........ H02P 29/50; H02P 27/08; H02P 27/085; H02P 21/00; H02P 21/001;
(Continued)

(56) References Cited

U.S. PATENT DOCUMENTS 11,258,357 B1 2/2022 Merl
2007/0252625 A1* 11/2007 Shin .................... H02M 7/5395
327/113

OTHER PUBLICATIONS

K. K. Tse, A Comparative Study of Carrier-Frequency Modulation Techniques for Conducted EMI Suppression in PWM Converters, IEEE.

* cited by examiner

*Primary Examiner* — Antony M Paul
(74) *Attorney, Agent, or Firm* — Gene Vinokur

(57) ABSTRACT

A controller is provided for generating carrier signals controlling a pulse width modulation (PWM) inverter driving an electric actuator. The controller includes an interface configured to connect to a victim circuit via sensors, wherein the victim circuit includes the power system or the electric actuator or a combination of the power system and the electric actuator, wherein the sensors are configured to measure an electromagnetic-interference (EMI) spectrum, a memory configured to store modulation frequency ranges, the measured electromagnetic-interference (EMI) spectral data of different frequency carriers, a desired EMI spectrum and a learning-based carrier design program, and a processor, in connection with the memory, configured to perform generating a frequency modulation (FM) carrier signal by solving an optimization problem, wherein the optimization problem is generated regarding a sweep time for a predetermined frequency by the learning-based carrier design program, and a PWM generator configured to generate PWM signals based on the FM carrier signal.

19 Claims, 11 Drawing Sheets

(51) Int. Cl.
*H02M 7/5395* (2006.01)
*H02P 27/08* (2006.01)

(58) Field of Classification Search
CPC .. H02P 21/0014; H02P 21/02; H02P 21/0025; H02P 23/0031; H02P 23/0018; H02P 23/28; H02P 25/062; H02P 25/064
See application file for complete search history.

| Carrier | 50kHz-150kHz | 10kHz-30MHz |
|---|---|---|
| Triangle | 85.27 | 86.63 |
| Random FM | 75.07 | 78.42 |
| Linear FM | 72.59 | 77.43 |
| Adaptive FM | 70.26 | 78.42 |
| Learned FM#1 | 68.78 | 78.67 |
| Learned FM#2 | 73.49 | 76.80 |

Fig. 8

ELECTROMAGNETIC INTERFERENCE (EMI) MITIGATION IN PULSE WIDTH MODULATION (PWM) INVERTERS USING LEARNING-BASED FREQUENCY MODULATED CARRIERS

FIELD OF THE INVENTION

The present invention is related to electromagnetic interference (EMI) mitigation of pulse width modulation (PWM) inverters, and more particularly to reshaping EMI spectrum of PWM inverters by using a learning method to design a frequency modulation carrier.

BACKGROUND OF THE INVENTION

Pulse Width Modulation (PWM) inverters are widely used in modern motor drive systems for their high efficiency and wide range of adjustable output frequency. However, the large dv/dt and di/dt of the switching devices during their operation generate serious electromagnetic interference (EMI) issues, such as violating EMC regulations, interfering with other nearby equipment, or even causing malfunction of the system itself. With the development of high-power-density, high-voltage, and high-switching-frequency semiconductor devices such as wide band-gap devices (WBG), there is an increasing need and interest in mitigating the EMI of power electronic devices to meet the rapid growing market in electric vehicles, electric aircraft, and renewable energy.

To reduce the EMI level in power electronic equipment, various methods have been studied and validated in the power electronics society, including soft switching, EMI filter (both passive and active), and circuit layout design, etc. All these techniques aim to reduce the time-domain magnitude of EMI, and consequently the overall EMI spectral level is also mitigated.

In recent years, frequency modulation (FM)-based methods have attracted a lot of attention in mitigating EMI spectral level of PWM inverters. PWM drive signal typically is generated by comparing a reference signal of a desired driving frequency with a periodic carrier signal such as a sinusoidal or triangular signal. Investigations show that the EMI spectrum of PWM inverters contains strong harmonic components of the carrier frequency which contribute the majority frequency components that exceed EMC regulations. Therefore, it is helpful to modulate the frequency of the carrier signal such that the harmonic energy can spread out in a relatively large frequency range. Although the overall EMI energy is not reduced by using the FM carrier signal, it has been demonstrated effective to mitigate the harmonic peaks in the EMI frequency spectrum to meet the requirement of EMC regulations.

Following this frequency modulation idea, a lot of frequency modulation schemes have been proposed to mitigate the EMI level of PWM inverters. For instance, a random FM scheme is proposed to randomize the switching time such that carrier harmonic energy can spread out in a corresponding frequency range, resulting in a reduced EMI spectral level. However, due to the nature of randomness, random carrier FM works well in a statistical sense and is relatively difficult to implement with hardware. Recently, a sine frequency modulation scheme is proposed, where the frequency of carrier signal changes within a range, following a sine wave pattern. A more general frequency modulation method can be found in U.S. patent Ser. No. 11/258,357 where an adaptive frequency modulation method is proposed to reduce carrier harmonic EMI received with consideration of EMI propagation characteristics. This adaptive frequency modulation method mainly focuses on the first order harmonics in the order of several hundred kHz, or only a small part of the conducted EMI frequency band [150 kHz, 30 MHz]. Therefore, there is a need to develop a controller and a signal processor for reducing the EMI level in power electronic equipment across the whole EMI frequency band [150 kHz, 30 MHz].

SUMMARY OF THE INVENTION

The present disclosure provides a novel controller and a signal processor for generating carrier signals controlling a pulse width modulation (PWM) inverter driving an electric actuator.

Some embodiments of the present disclosure are based on recognition that a learning-based method can provide a customized FM carrier signal for generating the PWM drive signal such that a desired EMI spectrum envelop can be achieved. Given EMI spectral data of a PWM inverter or a type of PWM inverter operating at different periodic carrier signals of different frequency, the carrier design problem is formulated as a constrained optimization problem, where the objective function is formed according to the desired EMI spectrum, and the constraint is placed on the weights of different frequency components such that the total EMI energy is unchanged. Once the weights are determined, we design a FM carrier signal with frequency modulation time is proportional to the corresponding weight. The expected EMI spectrum is represented as a linear combination of the EMI spectra under different periodic carrier signals with weights corresponding to different frequency. Compared to other empirical frequency modulated carrier design, our method is more customized and optimized for different devices. Simulation and experimental results show that a desired spectrum envelop can be achieved using the designed FM carrier.

According to some embodiments of the present disclosure, a controller is provided for generating carrier signals controlling a pulse width modulation (PWM) inverter driving an electric actuator. The controller includes an interface configured to connect to a victim circuit via sensors, wherein the victim circuit includes the power system or the electric actuator or a combination of the power system and the electric actuator, wherein the sensors are configured to measure an electromagnetic-interference (EMI) spectrum, a memory configured to store modulation frequency ranges, the measured electromagnetic-interference (EMI) spectral data of different frequency carriers, a desired EMI spectrum and a learning-based carrier design program, and a processor, in connection with the memory, configured to perform generating a frequency modulation (FM) carrier signal by solving an optimization problem, wherein the optimization problem is generated regarding a sweep time for a predetermined frequency by the learning-based carrier design program, and a PWM generator configured to generate PWM signals based on the FM carrier signal.

Further, some embodiments of the present disclosure are based on recognition that a signal processer is provided for generating modulation parameters used by a pulse width modulation (PWM) modulator that generates carrier signals controlling an inverter driving an electric actuator. The signal processor includes an interface configured to connect to the PWM modulator and sensors configured to measure an electromagnetic-interference (EMI) spectrum; a memory configured to store modulation frequency ranges, the measured electromagnetic-interference (EMI) spectral data of different frequency carriers, a desired EMI spectrum, and a learning-based carrier design program; and a processor, in connection with the memory, configured to perform: generating a frequency modulation (FM) carrier signal by solving an optimization problem, wherein the optimization problem is generated regarding a sweep time for a predetermined frequency by the learning-based carrier design program; and transmitting the generated FM carrier signal to the signal modulator configured to generate PWM signals based on the generated FM carrier signal.

BRIEF DESCRIPTION OF THE DRAWING

The presently disclosed embodiments will be further explained with reference to the attached drawings. The drawings shown are not necessarily to scale, with emphasis instead generally being placed upon illustrating the principles of the presently disclosed embodiments.

FIG. 8 show an exemplar result of summarizing EMI levels at different frequency ranges, according to some embodiments of the present disclosure.

DETAILED DESCRIPTION OF THE PREFERRED EMBODIMENTS

Figure 1:
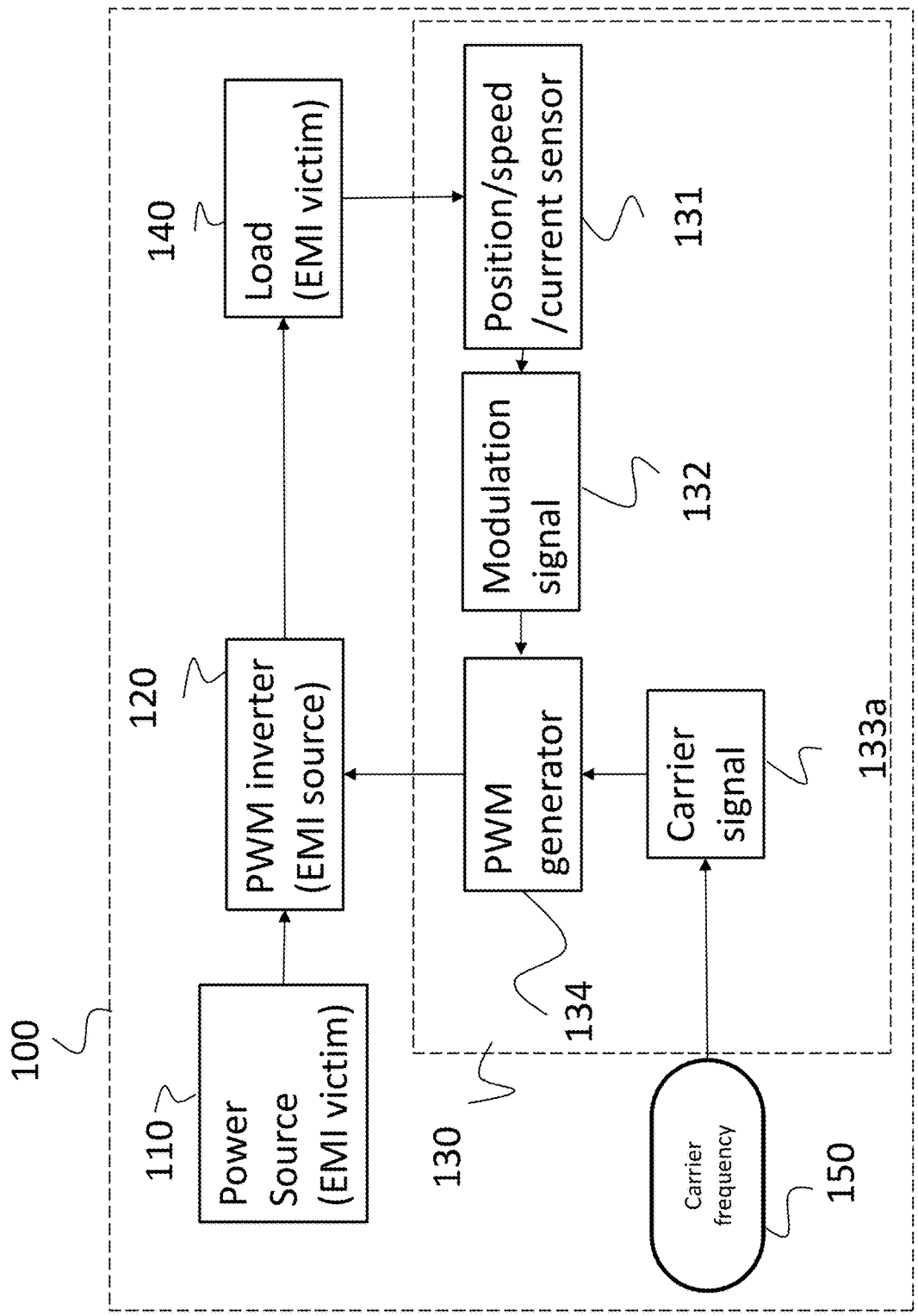
FIG. 1 shows a schematic diagram indicating a PWM inverter drive system according to some embodiments of the present disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In PWM inverters, the PWM control signal is generated by comparing a sinusoidal reference signal of a desired frequency with a high frequency carrier signal such as sinusoidal or triangular wave to generate a train of rectangular pulses with different widths to control the operation of switching devices. Let $f_r$ be the reference signal frequency, which is also the desired frequency of the inverter output. In the following part, we analyze different carrier signals from the EMI point of view, ignoring other side effects such as total harmonic distortion, heat loss, vibration, etc.

FIG. 1 shows a schematic diagram indicating a PWM inverter drive system 100 according to some embodiments of the present disclosure. The PWM inverter drive system 100 includes a power source/EMI victim 110, a PWM converter/EMI source 120, a controller 130, and a load 140. The controller 130 uses one or more sensors to get at one or more sensor information of position, speed, and motor current, and use the information to control the modulation signal frequency to a desired operating frequency 132, the modulation signal 132 is compared with a carrier signal 133a of a given carrier frequency 150 to generate a PWM signal (signals) 134 to control the switching operations of the PWM inverter.

Periodic Carrier

In conventional PWM inverters, high frequency periodic carriers such as sinusoidal, triangular, or saw-tooth signals are used to generate PWM signals. For simplicity, we consider sinusoidal carrier signal as a representative. Let $f_c$ be the carrier frequency and assume $f_c \gg f_r$. The sinusoidal carrier signal can be represented by $$c_S(t) = A\sin[\phi_c(t)] = A\sin(2\pi f_c t + \phi_0), \quad (1)$$

where A is the amplitude, $\phi_c(t)=2\pi f_c t+\phi_0$ is the phase of the sinusoidal carrier signal, and $\phi_0$ is the initial phase. Further Fourier analysis of the PWM inverter output shows that it includes abundant harmonic frequency components of order $(nf_c \pm k f_r)$, where n and k are non-negative integers.

Figure 2:
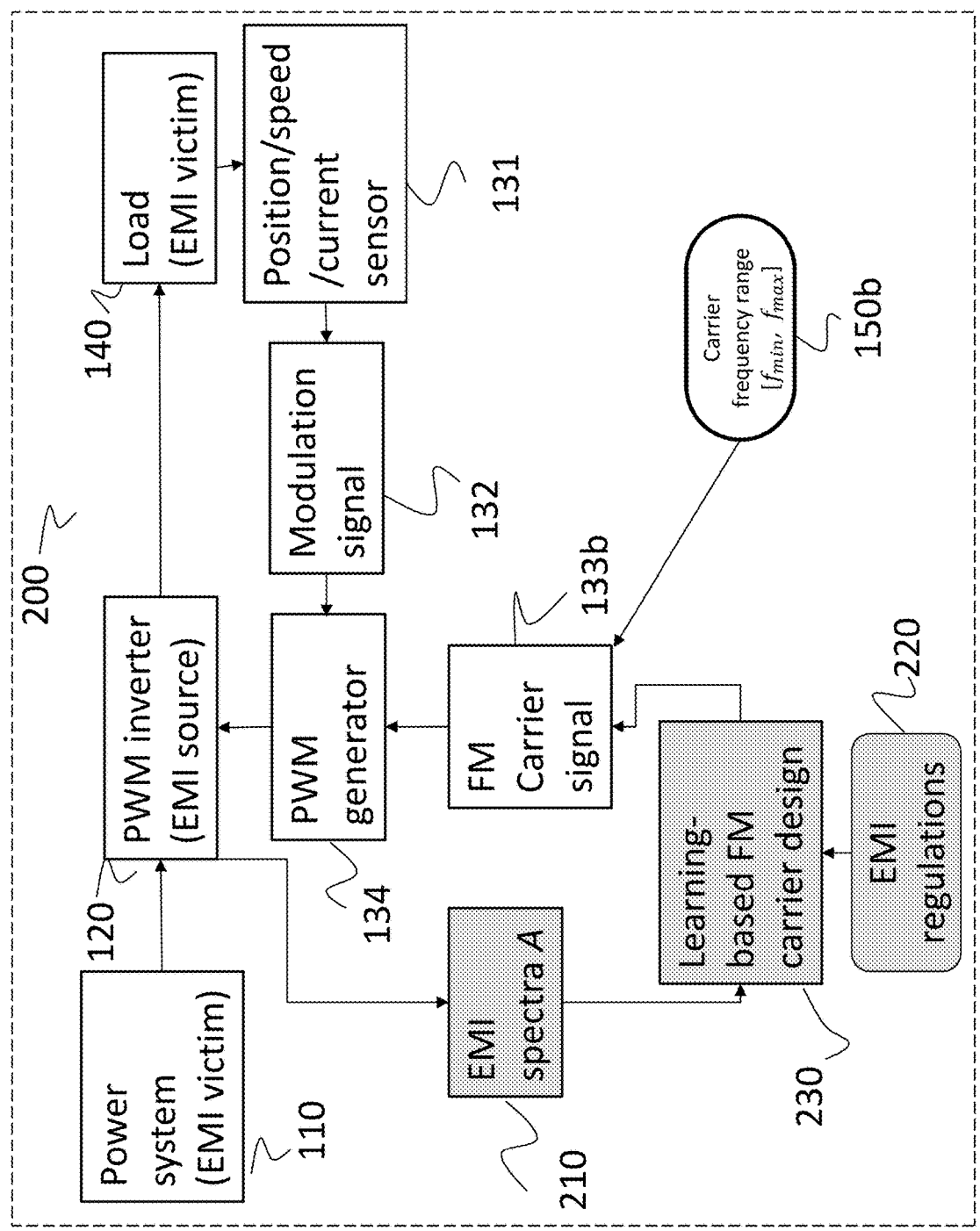
FIG. 2 shows a schematic diagram indicating a PWM inverter drive system using a learning-based frequency modulation carrier according to some embodiments of the present disclosure.

FIG. 2 shows a schematic diagram indicating a PWM inverter drive system 200 using a learning-based frequency modulation carrier according to some embodiments of the present disclosure. The PWM inverter drive system 100 includes a power source/EMI victim 110, a PWM converter/EMI source 120, a controller 130, and a load (victim circuit) 140. The controller 130 uses one or more sensors to get at one or more sensor information of position, speed, and motor current, and use the information to control the modulation signal frequency 132. The EMI spectra 210 generated by the PWM inverter/EMI source 120, using carrier signals 133*a* of different frequency in the carrier frequency range 150*b*, are measured as learning dataset. Given EMI regulations on EMI spectrum 220, a learning-based FM carrier design program (algorithm) 230 is performed to generate/design a frequency modulated carrier signal 133*b*. The modulation signal 132 is compared with a frequency modulated carrier signal 133*b* via a PWM generator 134 to generate a PWM signal. The PWM generator 134 is configured to control the switching operations of the PWM inverter by the generated PWM signal.

Figure 3:
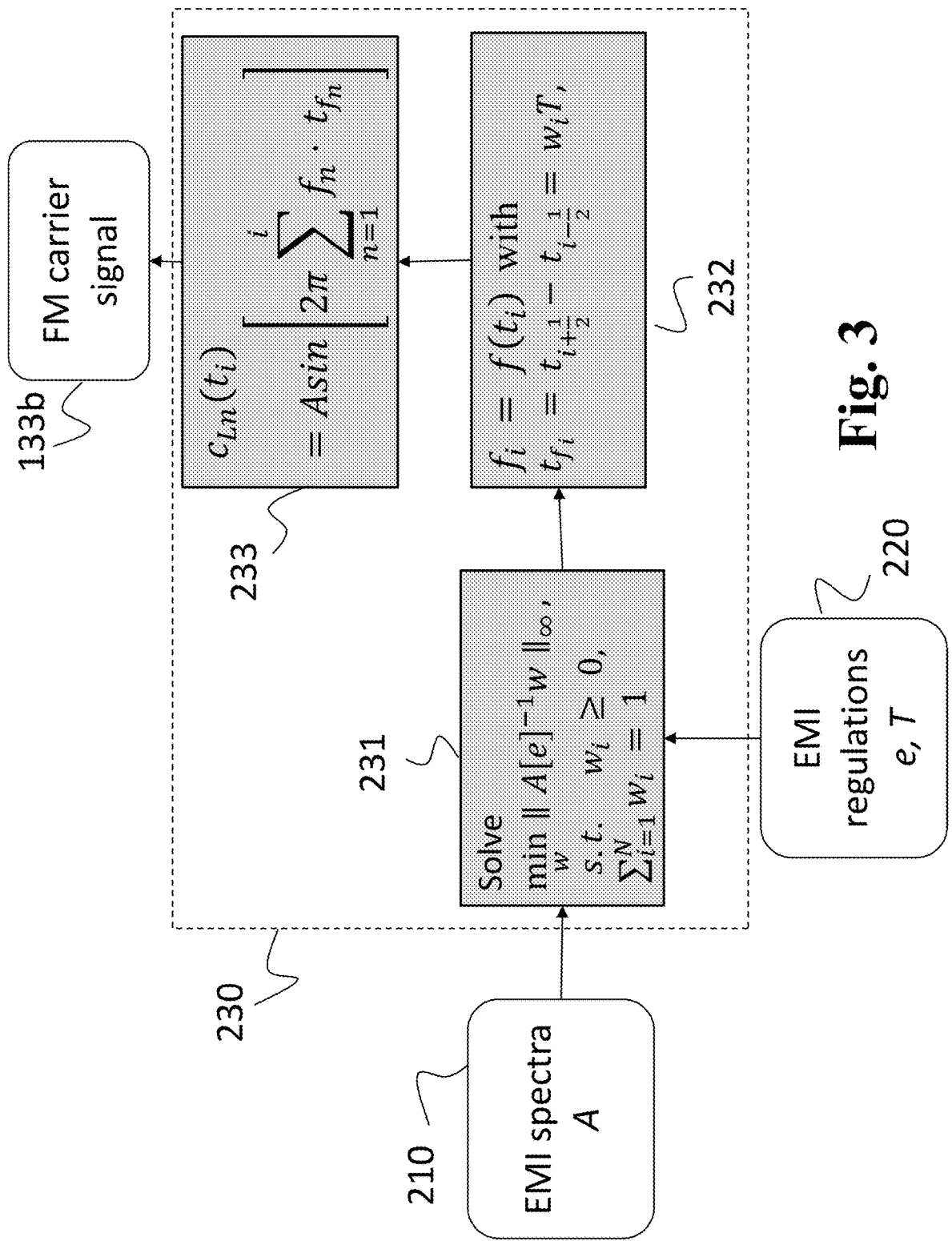
FIG. 3 shows a the flowchart of the learning-based frequency modulation carrier design method, according to some embodiments of the present disclosure.

FIG. 3 shows a the flowchart of the learning-based frequency modulation carrier design program (method) according to some embodiments of the present disclosure. Given measured EMI spectra A 210 and EMI regulations (desired EMI spectral shape) 220, a solver 231 included in a learning-based carrier design program 230 is used to solve an optimization problem of minimizing the maximum EMI level of across the conducted EMI frequency range [150 kHz, 30 MHz] according to the EMC regulations e, which defines the maximum allowed EMI level at different frequency within the conducted frequency EMI range [150 kHz, 30 MHz], with unknown sweep time weights of different frequency. The sweep time (duration) $t_{f_i}$ of frequency $f_i$ is then determined in 232 according to the solved weight and the total sweep time T according to EMI regulations. A frequency modulated (FM) carrier signal is then generated (computed) in 233 according to the frequency sweep time $t_{f_i}$, and output frequency modulation carrier signal 133*b* for the PWM generator 134.

B. Random FM Carrier

Random carrier frequency modulation (RCFM) has been proved to be an effective way to spread out the harmonic energy in the frequency domain and consequently to lower the EMI level. Let $t_{f_i}$ be the sweep duration of frequency $f_i \in [f_{min}, f_{max}]$ and T the total sweep duration of all frequencies. Then we have $$t_{f_i} = v_i T, \text{ s.t. } v_i \geq 0, \sum_i^N v_i = 1, \quad (2)$$

where $v_i$ is a fraction randomly drawn from [0, 1]. Because of the randomness, RCFM only provides improved performance statistically, not in a deterministic way. Since the carrier frequency is randomly modulated, the PWM inverter may perform differently when a different random modulation is employed.

C. Linear FM Carrier

Linear frequency modulation (LFM) equally distributes the sweeping time in the frequency range, $$t_{f_i} = T/N. \quad (3)$$

Let the time-domain LFM carrier signal be $$c_{LS}(t) = A\sin\left(2\pi\left[\frac{f_{max} - f_{min}}{4} u(T) + \frac{f_{max} + 3f_{min}}{4}\right]t' + \phi_0\right), \quad (4)$$

where $f_{min}$ and $f_{max}$ are the minimum and maximum sweep frequency, respectively, u(t) is a saw-tooth signal of period T with magnitude in the range [−1, 1], which can be written as $$u(t) = 2\left[\frac{t}{T} - \left\lfloor\frac{t}{T}\right\rfloor\right] - 1, \quad (5)$$

where $\lfloor \cdot \rfloor$ is the floor function that outputs the greatest integer less than the input real number; and $$t' = t - \left\lfloor\frac{t}{T}\right\rfloor T = \frac{u(t)+1}{2}T. \quad (6)$$

Given a fixed total EMI energy, the wider the sweep frequency range, the lower the EMI level. However, in practice the frequency range is restricted by various constraints. The lowest carrier frequency $f_{min}$ is typically constrained by the total harmonic distortion (THD) of the output voltage. If the carrier frequency is too low, the THD of output may be unacceptably high. The highest carrier frequency fmax is generally limited by the switching speed of devices or switching loss.

D. Adaptive FM Carrier

The above carrier designs aim to mitigate the EMI characteristics of the PWM signal, or the EMI source. In practice, EMI received by victims will be distorted after propagation. Adaptive carrier signal design incorporates the EMI propagation effect and pre-distorts the EMI source spectrum such that the EMI spectrum received by the victim is well compensated. For adaptive FM carrier, given a discrete uniform frequency sampling $[f_{min}=f_1 < f_2 < \ldots < f_N = f_{max}]$, the sweep duration $t_{f_i}$ of frequency $f_i$ is adaptively determined and inversely proportional to the corresponding EMI spectrum $M(f_i)$ when a linear FM carrier is used. The sweep duration of frequency $t_{f_i}$ can be expressed as $$t_{f_i} = t_{i+\frac{1}{2}} - t_{i-\frac{1}{2}} = \frac{\frac{1}{M(f_i)}}{\sum_{i=1}^{N} \frac{1}{M(f_i)}} T, i = 1, \ldots, N-1. \quad (7)$$

Then the frequency is modulated adaptively according to $$f_{NM}\left(t_{i+\frac{1}{2}}\right) = \frac{f_i + f_{i+1}}{2}, \qquad (8)$$

where the time $$t_{i+\frac{1}{2}}$$

is determined by (7).

In the adaptive FM carrier, the sweep time depends on the magnitude of the first order harmonics, i.e., $f_1, f_2, \ldots, f_N$. Not higher order harmonics. While the higher orders of harmonics can be overlapped to each other. For example, 120 kHz can be 6th order harmonic of 20 kHz, or 4th order harmonic of 30 kHz. To generalize the frequency modulation carrier method, we consider a learning-based method for carrier design.

Learning-Based PWM Carrier Design Method (Program)

From Section II, we observe that the performance of EMI mitigation using different FM carriers relies on the frequency modulation scheme. The sweep time of each carrier frequency determines the contribution of the corresponding EMI spectrum to the overall EMI spectrum. The longer sweep time of a frequency, the larger fractional weight on the EMI spectrum of the same frequency carrier. Since different devices exhibit different EMI propagation property, it is therefore desirable to optimize the FM carrier such that the overall EMI spectrum can meet EMC regulations with the largest margin, in other words achieve the lowest possible EMI level according to EMC limits.

Let $A \in R^{M \times N}$ be a non-negative matrix of learning data, where $A_i$ is the $i^{th}$ column representing the EMI frequency spectrum magnitude when a periodic carrier of frequency $f_i$ is employed to generate the PWM signal. Note that A is different from device to device.

Figure 4:
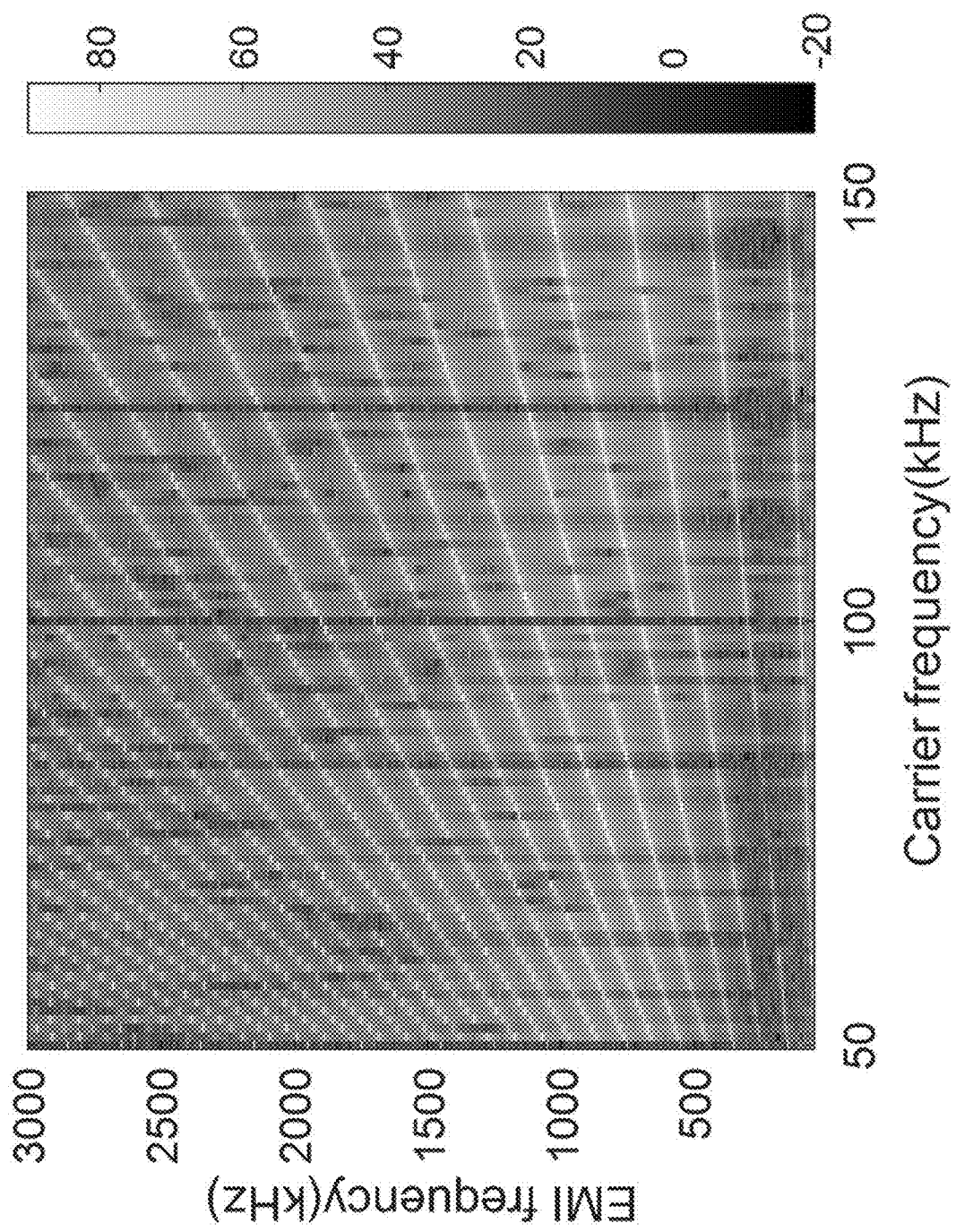
FIG. 4 shows the EMI spectral data map of A using periodic triangular carriers of different frequency from 50 kHz to 150 kHz with step size of 1 kHz, according to some embodiments of the present disclosure.

FIG. 4 shows the EMI spectral data map of A using periodic triangular carriers of different frequency from 50 kHz to 150 kHz, with step size of 1 kHz. Each column represents the EMI spectrum using the corresponding frequency carrier, with different gray level representing different magnitude in dB scale, as indicated in the right side gray scale bar.

Similarly, the sweep duration of frequency $f_i$ can be expressed as $$t_{f_i} = t_{i+\frac{1}{2}} - t_{i-\frac{1}{2}} = w_i T, \qquad (9)$$

where $w_i$ is the $i^{th}$ element of the weight vector $w=[w_1, w_2, \ldots, w_N]^T \in R^N$ related to the sweep duration of the carrier frequency at $f_i$. Assuming that the overall EMI spectrum is a superposition of EMI spectra using different single frequency carriers, then the expected EMI with the designed FM carrier can then be expressed as $$E_{FM} = Aw. \qquad (10)$$

EMC standards regulate EMI levels of electronic products. However, EMC regulations vary for different types of products and different countries or area regions. Our learning-based carrier provides flexibility of EMI mitigation to some extent. Consider an EMC regulation where the maximum EMI level is constrained by a certain level. In such case, the weights of different frequency can be determined by solving an optimization problem $$\min_w \|Aw\|_\infty, \quad \text{s.t.} \quad w_i \geq 0, \quad \sum_{i=1}^N w_i = 1. \qquad (11)$$

Once we get the weight w, it is straightforward to get the sweeping frequency as a function of time, i.e.

$$f_i = f(t_i) \text{ with } t_i = \sum_{n=1}^{i-1} w_n T. \qquad (12)$$

The learning-based carrier's signal can be computed as $$c_{Ln}(T) = A\sin[\phi_{\{Ln\}(t)}], \qquad (13)$$

where the phase $$\phi_{Ln}(t_i) = 2\pi \sum_{n=1}^{i} f_n \cdot t_{f_n}. \qquad (14)$$

In some situations, EMC standards regulate different EMI levels depending on different frequency bands. For instance, $Aw \leq e$, where e represents the up limit of the EMI level. The objective function is then modified by according to EMC regulations as $$\min_w \|A[e]^{-1}w\|_\infty, \quad \text{s.t.} \quad w_i \geq 0, \quad \sum_{i=1}^N w_i = 1, \qquad (15)$$

where e is a vector of frequency spectrum provided by EMC regulations, and $[e]^{-1}$ is a diagonal matrix with the diagonal element being the element of e. It is straight forward to solve the optimization problem with disciplined convex programming such as CVX. Through learning-based carrier design method (program), the EMI spectrum can be reshaped such that a relatively large margin between the allowed EMI level and the actual EMI level is achieved according to the EMC regulations.

Figure 5:
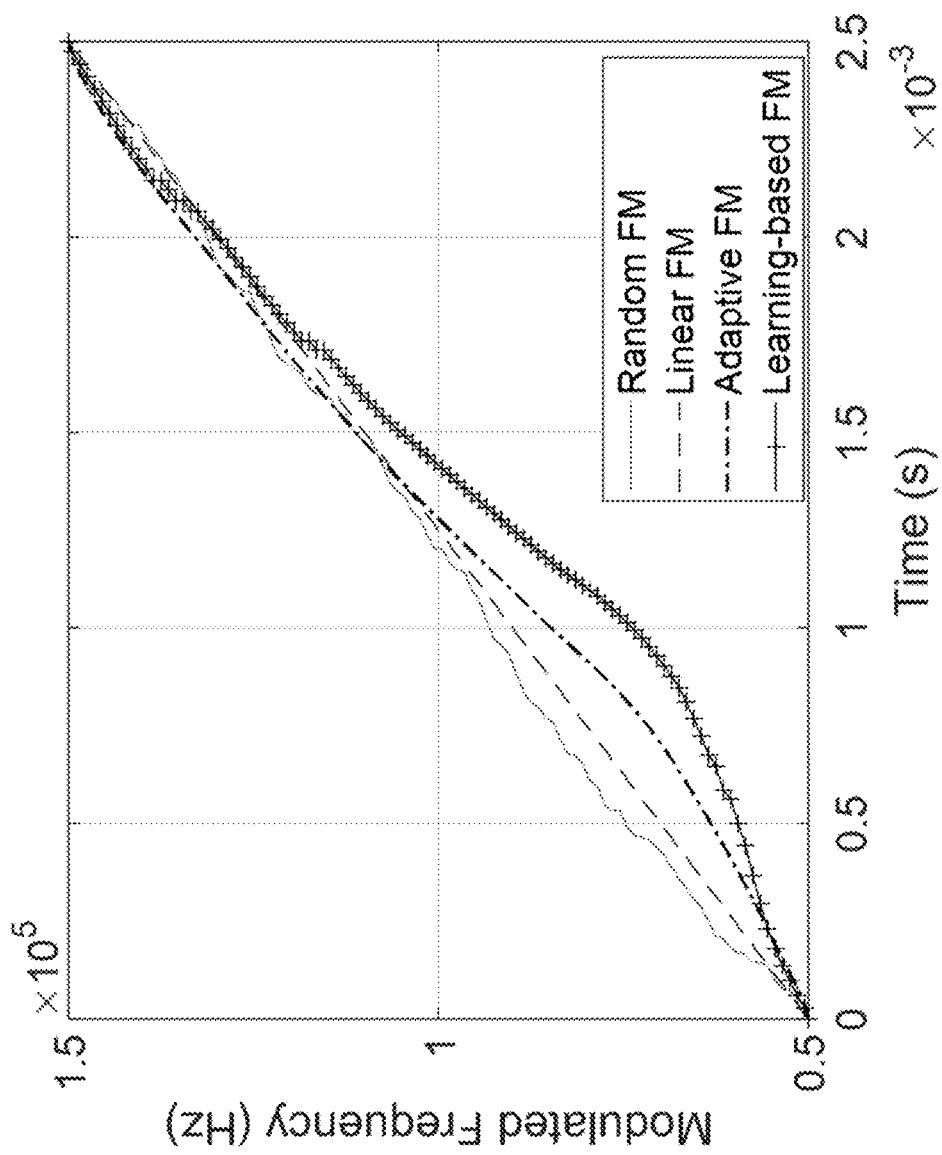
FIG. 5 shows different frequency modulation functions of carrier signals using different existing methods as well as the learning-based design method, according to some embodiments of the present disclosure.

FIG. 5 shows different frequency modulation functions of carrier signals using different existing methods as well as the learning-based design method, according to some embodiments of the present disclosure. For linear frequency modulation (FM), the modulation function is a straight line, meaning the carrier frequency increases linearly with time in each sweep duration from the minimum carrier frequency to the maximum carrier frequency. For random FM, the modulation function is an irregular curve, indicating its carrier frequency increases with randomly steps from the minimum carrier frequency to the maximum carrier frequency. For adaptive FM and learning-based FM, the frequency increases with time adaptively or follow a pattern learned from measured EMI spectrum such that the EMI spectrum can achieve a desirable level.

Figure 6A:
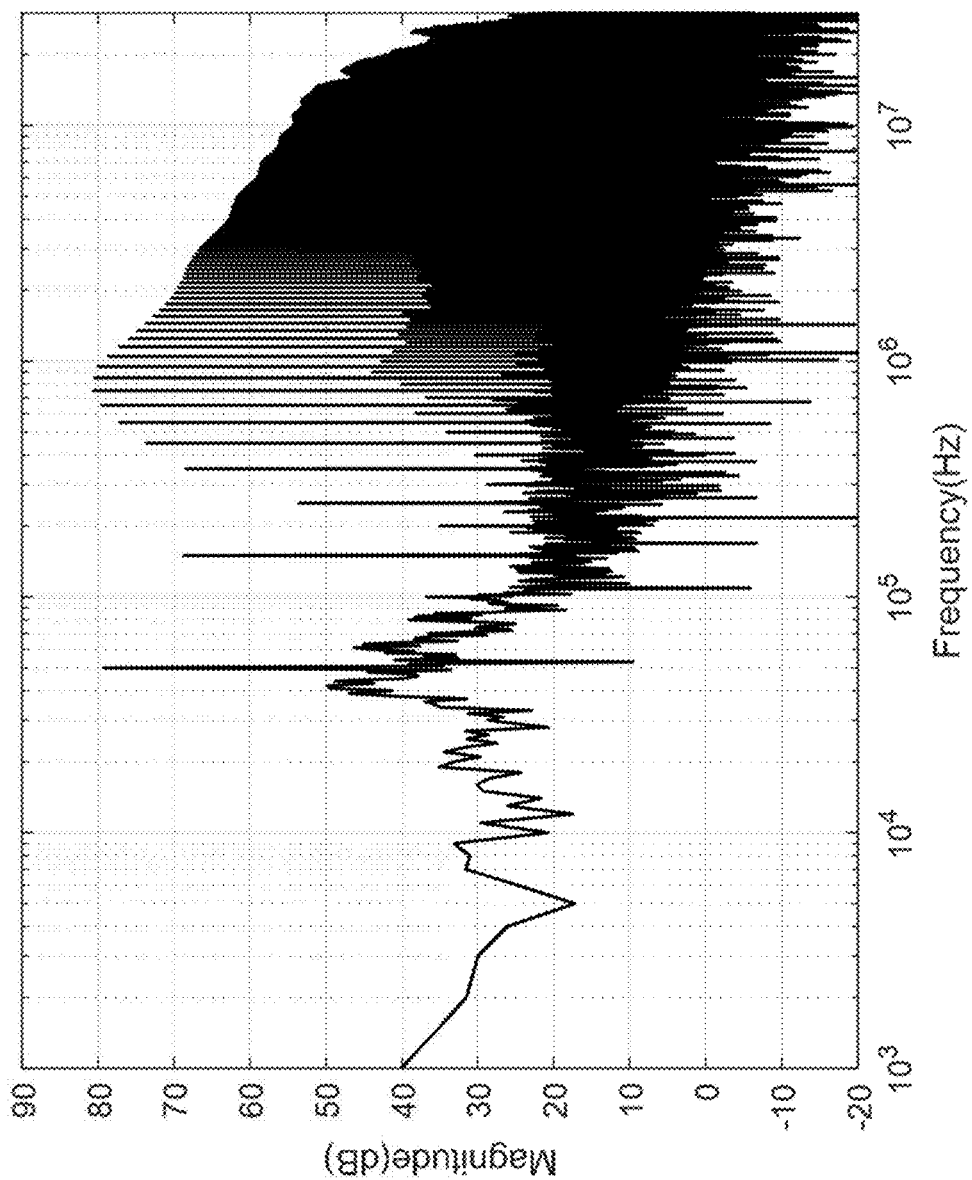
FIG. 6a-FIG. 6e show the EMI spectra using a periodic carrier signal, a random FM carrier, a linear FM carrier, an adaptive FM carrier, and a learning-based carrier using the proposed method, respectively, according to some embodiments of the present disclosure.
Figure 6B:
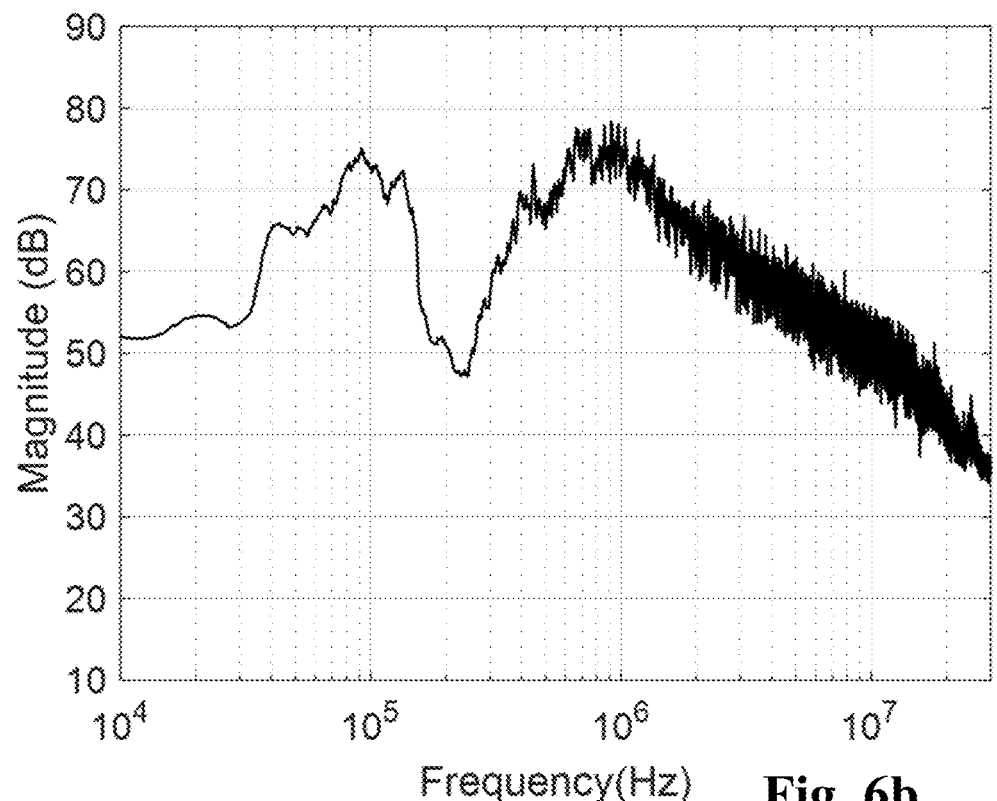
Figure 6C:
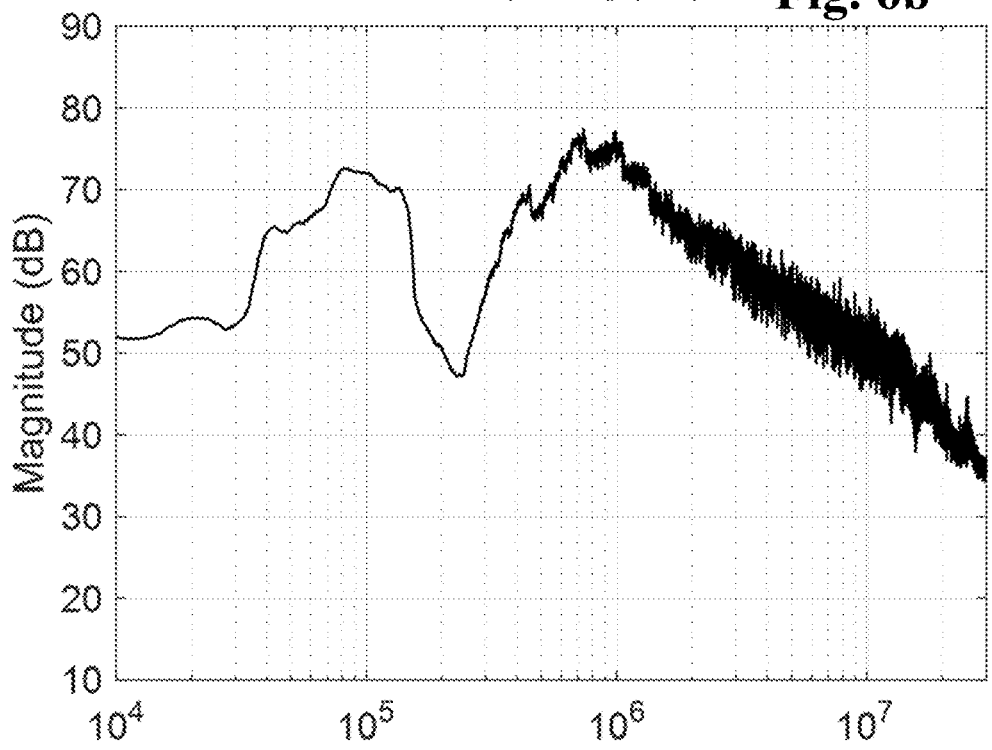
Figure 6D:
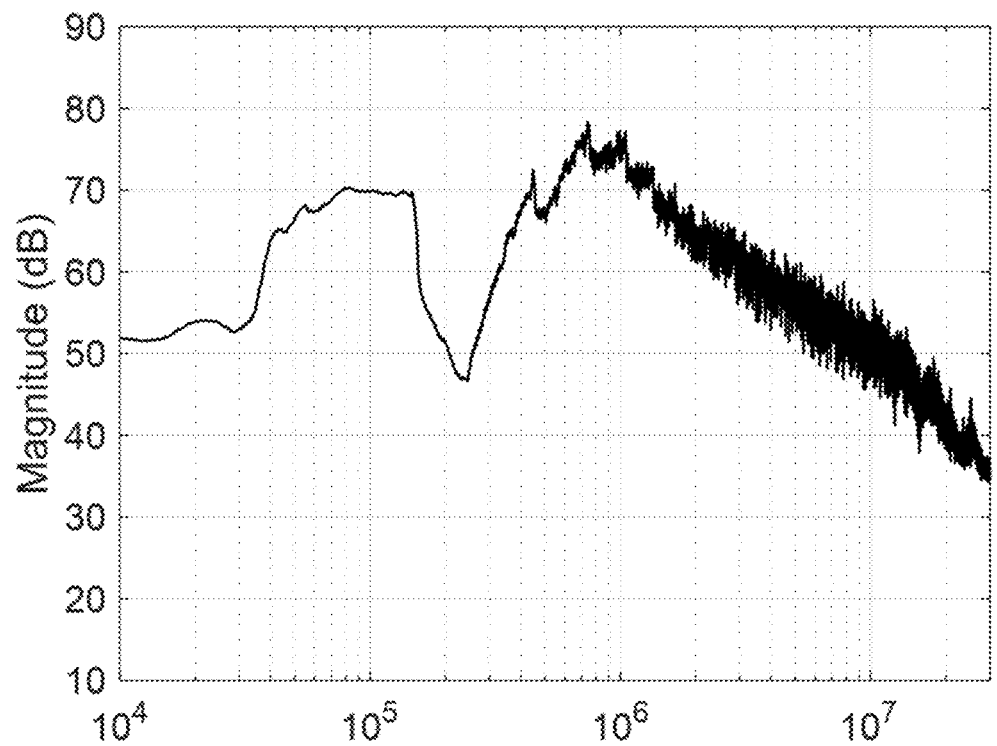
Figure 6E:
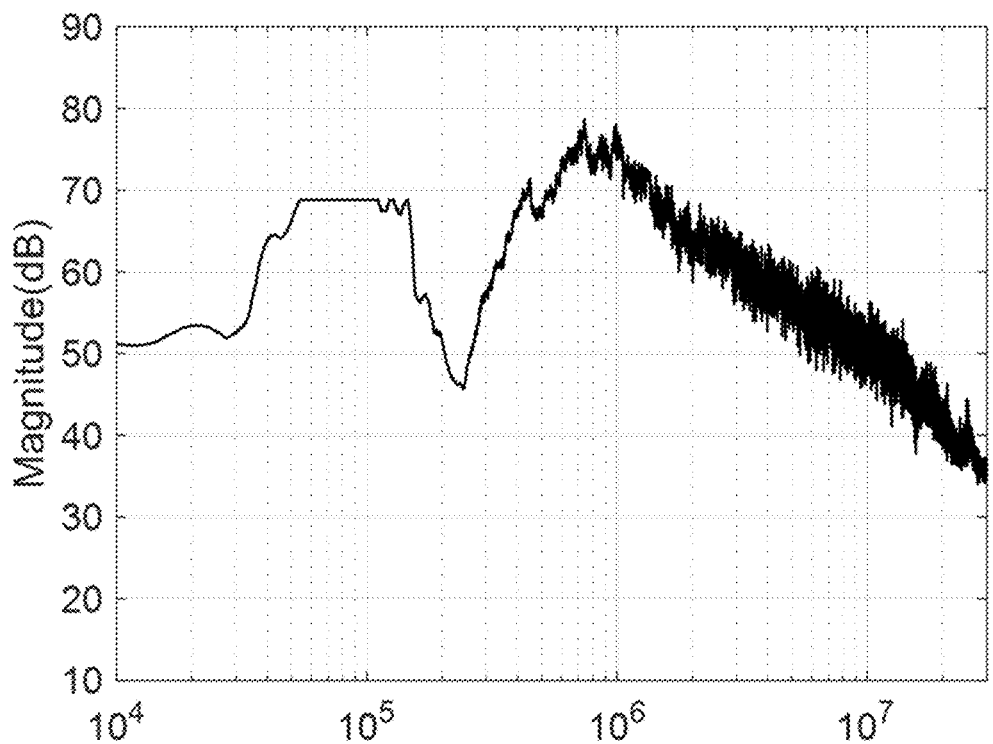

FIGS. 6a-6e show the EMI spectra using a periodic carrier signal, a random FM carrier, a linear FM carrier, an adaptive FM carrier, and a learning-based carrier using the proposed method, respectively. In FIG. 6a we shown an example plot of PWM frequency spectrum where we use $f_r$=200 Hz and $f_c$=50 kHz. We can observe that the EMI spectrum contains strong harmonics of the carrier frequency, especially the first order harmonic.

For the random FM carrier, the adaptive FM carrier, and the learning-based carrier, the sweep frequency range of [50, 150] kHz is considered. The random carrier frequency modulation FIG. 6b significantly mitigates the EMI level by about 10 dB compared to that using a periodic triangular carrier FIG. 6a overall, but the first order harmonic level from 50 kHz to 150 kHz is not well suppressed. When a linear frequency modulation carrier is employed FIG. 6c, the first order harmonic and conducted EMI is reduced further by about 2.5 dB, but not in a flat shape. When an adaptive FM carrier based on the first order harmonic is adopted FIG. 6d, the first order harmonic is reduced by another 2.3 dB. However, the maximum conducted EMI level is increased at the same time. For our learning-based carrier (#1) FIG. 6e that aims to reduce first order harmonics, the first order harmonic level is mitigated to a minimum level of 68.78 dB, the lowest among those of different carriers.

Figure 7A:
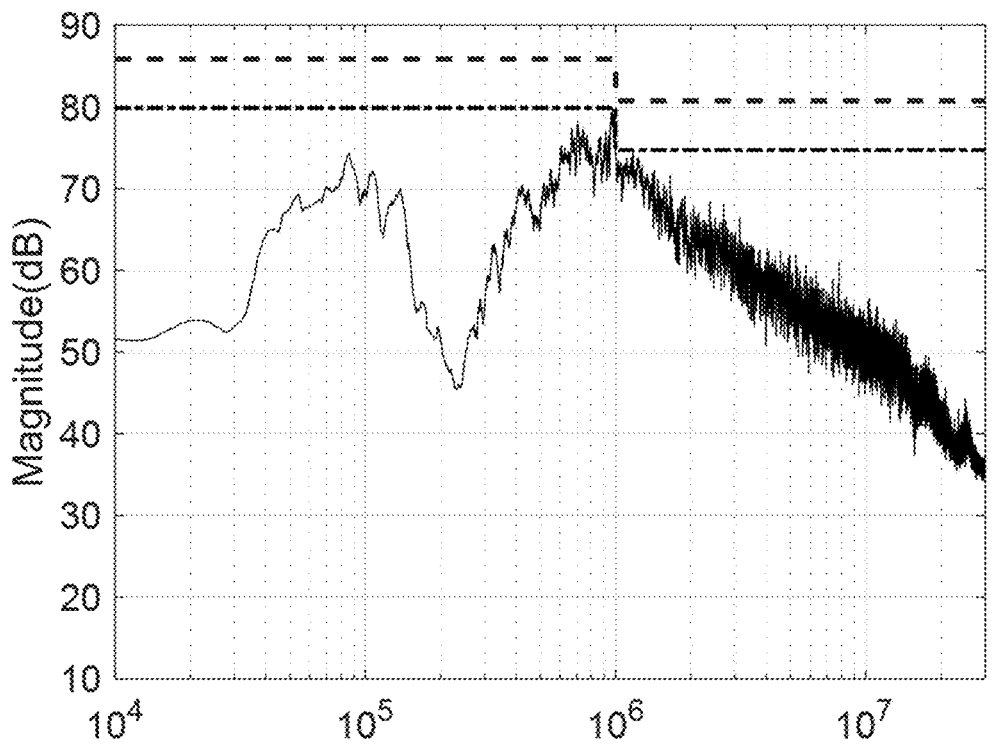
FIG. 7a shows an exemplar result of minimizing the whole conducted EMI level using a learning-based carrier (#2), according to some embodiments of the present disclosure.

FIG. 7a plots an exemplar result of minimizing the whole conducted EMI level using a learning-based carrier (#2). The overall level of synthesized EMI is reduced to 76.8 dB, which is also the lowest among those of different FM carriers.

Figure 7B:
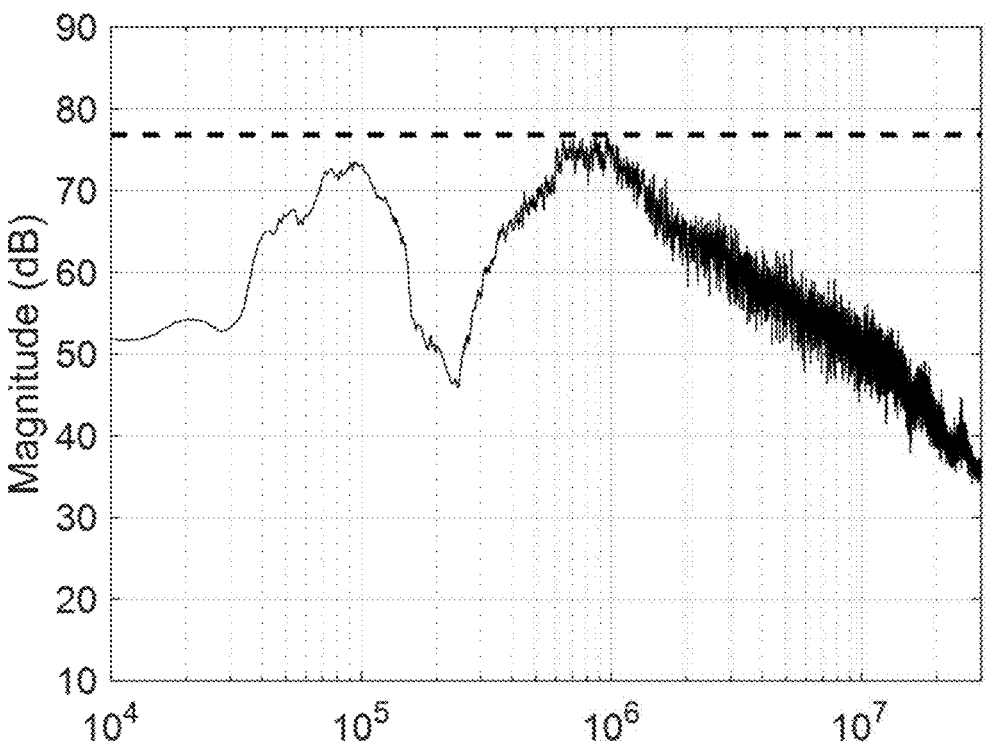
FIG. 7b shows an exemplar result of minimizing different frequency range EMI levels according to EMC regulations, according to some embodiments of the present disclosure.

FIG. 7b plots an exemplar result of minimizing different frequency range EMI levels according to EMC regulations, where the top dash line represents EMC regulation, and the bottom dash-dot line represents the maximum level of specific frequency ranges, with respect to different conducted EMI frequency ranges of [10 kHz, 1 MHz] and [1 MHz, 30 MHz] respectively.

FIG. 8 plots an exemplar result of summarizing EMI levels at different frequency ranges, where the frequency range [50 kHz, 150 kHz] corresponds to the first order harmonics, and [10 kHz-30 MHz] corresponds to the conducted EMI.

Figure 9:
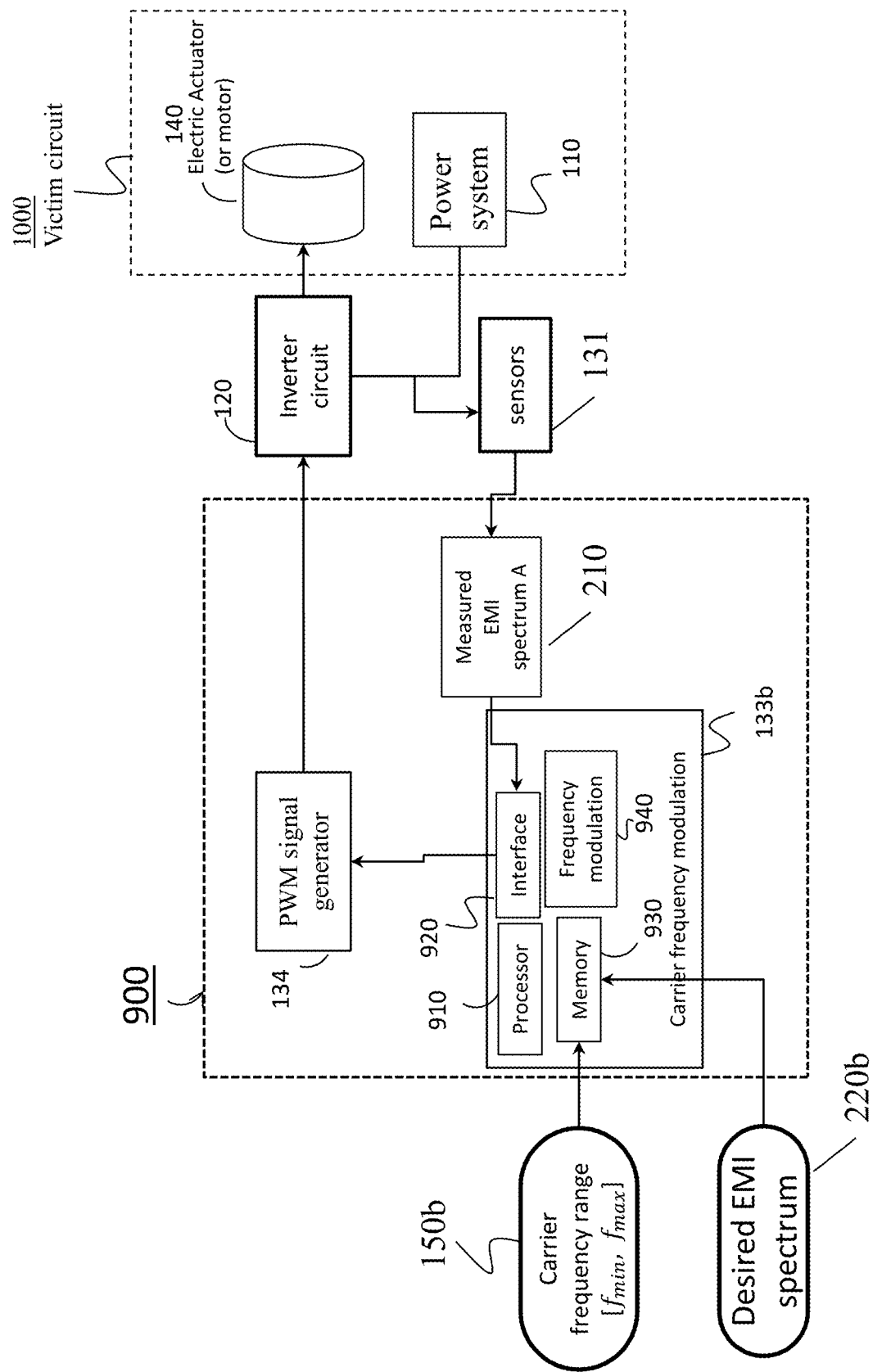
FIG. 9 is a schematic illustrating an example configuration of a controller for generating carrier signals controlling an inverter driving an electric actuator, according to some embodiments of the present disclosure.

FIG. 9 is a schematic illustrating an example configuration of a controller 900 for generating carrier signals controlling an inverter driving an electric actuator, according to some embodiments of the present disclosure. The controller 900 is configured to generate PWM signals controlling an inverter circuit 120 that drives an electric actuator 140 (or motor). The controller 900 includes carrier frequency modulation unit (circuit module) 133b and a PWM signal generator 134. The carrier frequency modulation unit 133b is configured to perform the process 910 including steps for generating frequency modulation carrier signals. The carrier frequency modulation unit 133b may include an interface (interface controller) 920 configured to connect to the sensor 131 connected to the invertor circuit 120 to measure EMI spectra data A 210 (measured electromagnetic-interference (EMI) spectrum 210) using the sensor 131, a processor 910, a memory unit 930 configured to store the measured electromagnetic-interference (EMI) spectrum 210, a carrier frequency range 150b, and a desired EMI spectrum 220b according EMC regulations 220, where in the desired EMI spectrum 220b can be lower than the allowed EMI level according to EMC regulations 220 by a constant. The processor 910 is configured to perform computing a PWM reference signal. The carrier frequency modulation unit 940 is configured to compute the sweep time of each discrete frequency in each sweep period using learned weights according to 231 and to modulate carrier frequency based on the sweep time of each frequency. The controller 900 further includes a PWM signal generator 134 that is configured to generate PWM signals based on frequency modulation carrier signal and the reference signal. The PWM signal generator 134 can transmit the PWM signals to the inverter circuit 120.

In some cases, the measured EMI spectrum 210 is obtained based on a linear frequency modulation (LFM) carrier, the frequency modulation may be performed by periodic sawtooth signal. Further, the modulation frequency may be performed as a function of the EMC regulations. The measured EMI spectrum 210 may be obtained from a frequency response of the victim circuit using a LISN when a linear frequency modulation carrier signal is used to generate PWM signal for the inverter circuit 120.

In another embodiment, the processor 910 can be a signal processor 910 that may be configured for generating modulation parameters to be used by a PWM signal generator 134 that generates PWM signals controlling the inverter circuit 120 driving an electric actuator 140. The signal processor 910 is connected to an interface 920 configured to connect to the PWM signal generator 134, a memory unit 930 configured to store a measured electromagnetic-interference (EMI) spectrum 210, and a desired EMI spectrum 220b. In this case, the signal processor 910 is configured to compute weights related to the sweep frequency duration for a frequency range, where the weights are determined by EMC regulations of a victim circuit 1000 including at least the power system 110 or at least the electric actuator 140 or a combination of the power system 110 and the electric actuator 140. Further, the signal processor 910 is configured to compute the sweep time of each frequency in each sweep period according to the weights. The signal processor 910 is configured to modulate the frequency of carrier signal according to the sweep time of each frequency to generate frequency modulation carrier and to transmit the frequency modulation carrier to the PWM signal generator 134. After receiving the frequency modulation carrier, the PWM signal generator 134 generates PWM signals based on the frequency modulation carrier and the reference signal of the signal processor 910 and transmits the PWM signal to the inverter circuit 120, such that EMI level to the victim circuit 1000 meets EMC regulations.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A controller for generating carrier signals controlling a pulse width modulation (PWM) inverter driving an electric actuator, comprising:
   an interface configured to connect to a victim circuit via sensors, wherein the victim circuit includes the power system or the electric actuator or a combination of the power system and the electric actuator, wherein the sensors are configured to measure an electromagnetic-interference (EMI) spectrum;
   a memory configured to store modulation frequency ranges, the measured electromagnetic-interference (EMI) spectrum, a desired EMI spectrum and a learning-based carrier design program; and
   a processor, in connection with the memory, configured to perform:
      generating a frequency modulation (FM) carrier signal by solving an optimization problem, wherein the optimization problem is generated regarding a sweep time for a predetermined frequency by the learning-based carrier design program; and
      a PWM generator configured to generate PWM signals based on the FM carrier signal.

2. The controller of claim 1, wherein the PWM generator modulates a frequency of a carrier signal based on a sweep time learned from EMI spectral data.

3. The controller of claim 1, wherein the PWM generator monotonically increases the carrier frequency based on a learned frequency modulation carrier.

4. The controller of claim 1, wherein the PWM generator monotonically decreases a carrier frequency of the PWM signals based on a learned frequency modulation carrier.

5. The controller of claim 1, wherein the FM carrier signal is a sawtooth carrier.

6. The controller of claim 1, wherein the PWM generator modulates the FM carrier signal as a function of EMC regulations.

7. The controller of claim 1, wherein the measured EMI spectrum is obtained from a frequency response of the victim circuit using a learned frequency modulation.

8. The controller of claim 7, the learned frequency modulation is performed by a linear modulation sine or triangle wave.

9. The controller of claim 1, wherein the victim circuit is a power system or an electric actuator.

10. The controller of claim 1, wherein the PWM inverter operates at least three phases.

11. The controller of claim 1, wherein the PWM inverter is connected to the electric actuator, wherein the PWM signals are transmitted to the inverter via the interface.

12. A signal processor for generating modulation parameters used by a pulse width modulation (PWM) modulator that generates carrier signals controlling an inverter driving an electric actuator, comprising:
   an interface configured to connect to the PWM modulator and sensors configured to measure an electromagnetic-interference (EMI) spectrum;
   a memory configured to store modulation frequency ranges, the measured electromagnetic-interference (EMI) spectral data of different frequency carriers, a desired EMI spectrum and a learning-based carrier design program; and
   a processor, in connection with the memory, configured to perform:
      generating a frequency modulation (FM) carrier signal by solving an optimization problem, wherein the optimization problem is generated regarding a sweep time for a predetermined frequency by the learning-based carrier design program; and
      transmitting the generated FM carrier signal to the signal modulator configured to generate PWM signals based on the generated FM carrier signal.

13. The signal processor of claim 12, wherein the PWM modulator modulates a frequency of a carrier signal based on a sweep time learned from EMI spectral data.

14. The signal processor of claim 12, wherein the PWM modulator monotonically increases the carrier frequency based on a learned frequency modulation carrier.

15. The signal processor of claim 12, wherein the PWM modulator monotonically decreases a carrier frequency of the PWM signals based on a learned frequency modulation carrier.

16. The signal processor of claim 12, wherein the generated FM carrier signal is a sawtooth carrier.

17. The signal processor of claim 12, wherein the PWM modulator modulates the FM carrier signal as a function of EMC regulations.

18. The signal processor of claim 12, wherein the measured EMI spectrum is obtained from a frequency response of a victim circuit using a learned frequency modulation.

19. The signal processor of claim 18, wherein the victim circuit is a power system or an electric actuator.

* * * * *